Figure 3:
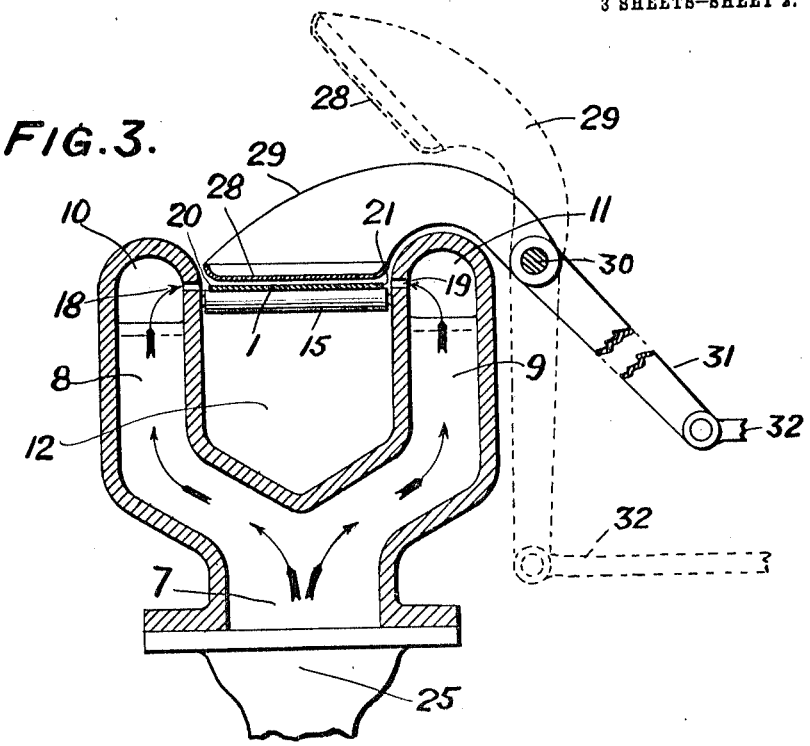

W. J. & J. W. MOON.
APPARATUS FOR MANUFACTURING METAL TUBES.
APPLICATION FILED AUG. 30, 1910.
1,026,275.
Patented May 14, 1912.
3 SHEETS—SHEET 1.
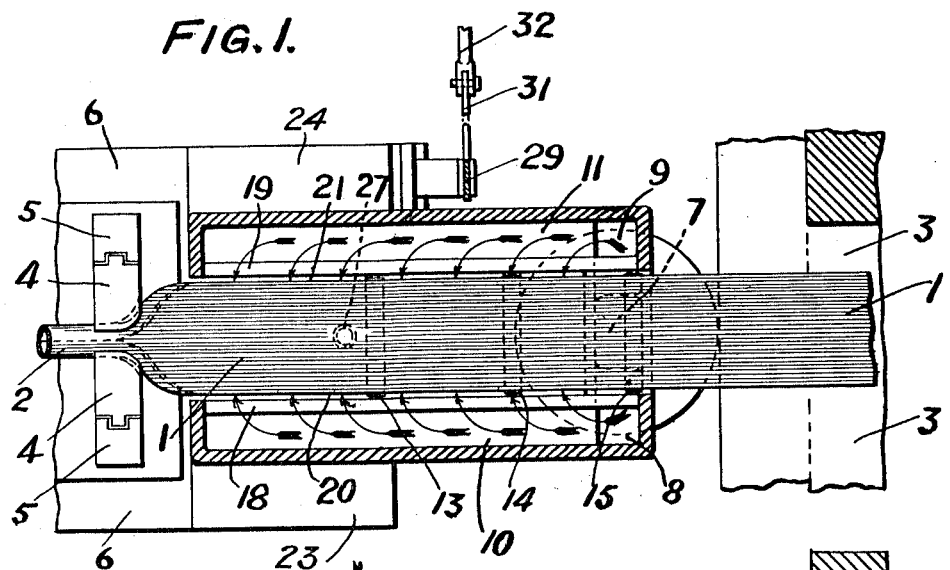
FIG. 1.
FIG. 2.
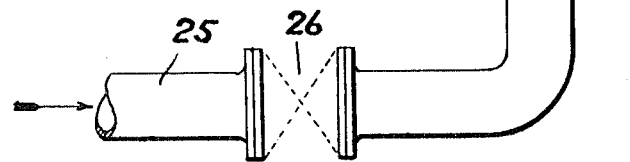
WITNESSES:
INVENTORS.
Wesley J Moon
John W. Moon
BY Harding & Harding
ATTORNEYS.

W. J. & J. W. MOON.
APPARATUS FOR MANUFACTURING METAL TUBES.
APPLICATION FILED AUG. 30, 1910.

1,026,275.

Patented May 14, 1912.

3 SHEETS—SHEET 2.

WITNESSES:
Rob't R. Kitchel.
E. E. Wall

INVENTORS
Wesley J. Moon
John W. Moon
BY Harding & Harding
ATTORNEYS.

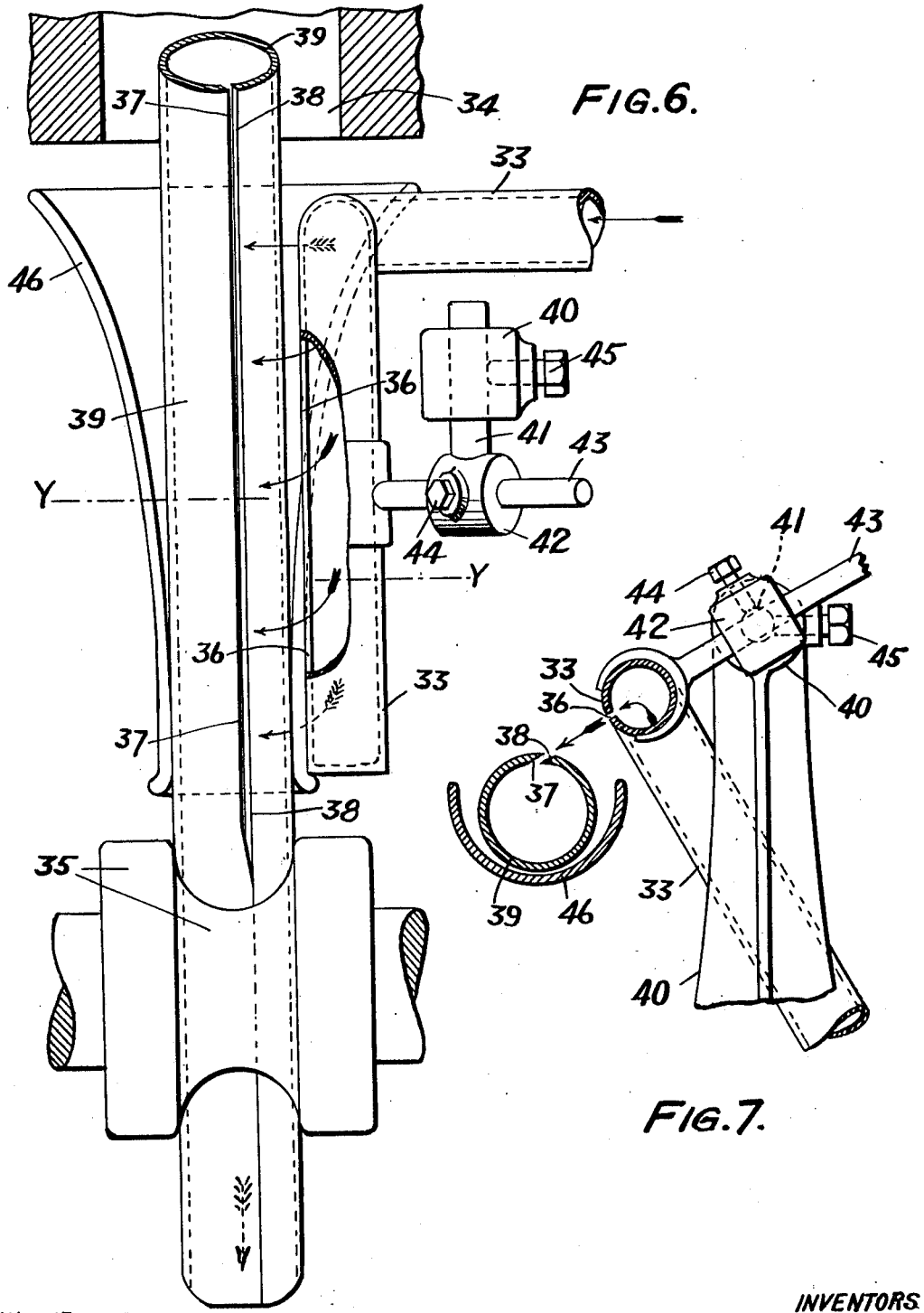

UNITED STATES PATENT OFFICE.

WESLEY J. MOON, OF ECONOMY, AND JOHN W. MOON, OF CONSHOHOCKEN, PENNSYLVANIA.

APPARATUS FOR MANUFACTURING METAL TUBES.

1,026,275.     Specification of Letters Patent.     Patented May 14, 1912.

Original application filed June 11, 1907, Serial No. 378,369. Divided and this application filed August 30, 1910. Serial No. 579,726.

*To all whom it may concern:*

Be it known that we, WESLEY J. MOON and JOHN W. MOON, citizens of the United States, residing at Economy, county of Beaver, State of Pennsylvania, and Conshohocken, county of Montgomery, State of Pennsylvania, respectively, have invented a new and useful Improvement in Apparatus for Manufacturing Metal Tubes, of which the following is a full, clear, and exact description, reference being had to the accompanying drawings, which form a part of the specification.

This invention has reference to the manufacture of butt welded and lap welded steel and iron tubes, and consists of the improvements herein described whereby a perfect weld is assured without any liability of the strip or skelp of which the tube is formed being damaged or deteriorated through overheating, and without any liability of an imperfect weld being secured because of the presence of foreign matter such as sand and scale on the welding edges of the strip or skelp.

At the present time, in one way of manufacturing butt welded iron and steel tubes, the strips are heated to a welding heat in the furnace and are drawn one at a time through a bell at the front of the furnace, which has the effect of forming the strip into a tube and squeezing its edges together so as to make a butt welded joint. It sometimes happens, however, that the strip is made too hot so that it is buckled, or it is burnt, and an improper weld is formed, or the tube is elongated in the drawing and welding process and is distorted and spoiled. It also frequently happens that foreign matter such as sand, scale, etc., accumulates on the butt edges of the strip in the furnace, and the presence of such matter makes a perfect weld impossible.

Our invention, which obviates all these defects, is carried out as follows in the manufacture of butt welded tubes:—At the front of the furnace and between it and the bell where the butt edges of the strip meet and are welded together, we employ one or more nozzles and an air blast (or an air and gas blast) passing through the nozzle or nozzles so arranged as to be directed upon the heated butt edges of the strip just prior to its passing through the bell. The strip is heated in the furnace to that degree of heat at which a cinder is formed on the edges of the strip, said degree of heat being hereinafter called the cinder stage. While some grades of iron and steel will weld properly at this cinder stage, so that it is often spoken of as the welding heat, the majority of grades of iron and steel must be heated beyond the cinder stage to secure a heat at which a proper weld can be made. We find that by applying an air blast alone of ordinary temperature to the edges of the strip already brought to the cinder stage, the temperature of the edges will be raised to the proper welding heat for all grades of iron and steel, so that as the edges are pressed together by passing through the bell a perfect butt weld is formed. It is obvious that the same result will be obtained by the application of an air and gas blast. Thus when employing our invention it is necessary to heat the strip only to the cinder stage, and therefore the furnace need not be hot enough to overheat and distort or burn the strip, because by the application of the air blast or the air and gas blast in the manner aforesaid we obtain the proper welding heat only at the extreme edges of the strip at the moment prior to and during the welding process in the bell. Thus a proper weld is assured and the amount of waste is reduced to a minimum. We find that by the application of an air blast of substantial pressure in the manner aforesaid the edges of the strip are cleansed of all foreign matter such as sand, scale, etc., by blast force or accelerated combustion, so that there is no longer any liability of an imperfect weld being formed due to the presence of such foreign matter on the edges of the strip. We find that by the application of an air blast to the upper and lower flat surfaces of the strip just after it leaves the furnace the same cleansing effect can be had on these surfaces, so that the interior and exterior of the finished tube will be free from the aforesaid foreign matter. Our invention is also similarly applied to the manufacture of lap welded iron and steel tubes as in this case we employ the said one or more nozzles with the air blast (or air and gas blast) arranged to be delivered and to impinge on the scarfed edges of the strip as it leaves the furnace and just before it passes through the welding rolls so that by this means the scarfed edges are raised to the proper welding heat and a proper and perfect lap weld is formed, the other part of body of the tube meanwhile being less hot and therefore without any risk of its being overheated.

Figure 4:
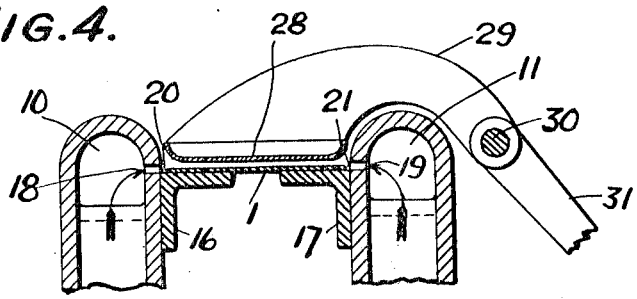
Figure 5:
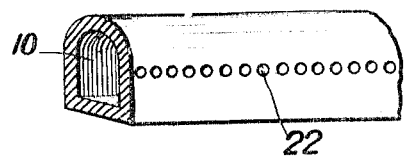

In the accompanying drawings Figure 1 is a sectional plan of an arrangement of our invention applied to the manufacture of butt-welded iron and steel tubes directly from flat strips; Fig. 2 is a sectional side elevation of the same; Fig. 3 is a cross sectional elevation of the same taken on line X X of Fig. 2; Fig. 4 is also a cross sectional elevation of the upper part of the same but showing a slightly modified arrangement of the guides for the strip; Fig. 5 shows an alternative form of blast pipe; Fig. 6 is a sectional plan of our invention applied to the manufacture of lap welded iron and steel tubes and Fig. 7 is a cross sectional elevation of this arrangement of our invention in line Y Y of Fig. 6.

In the arrangement of our invention illustrated by Figs. 1, 2, 3 and 4, 1 is the heated flat iron or steel strip for forming the butt welded tube 2, and 3 is the mouth of the furnace from which the heated strip is being drawn through the bell 4 which, as is well known, is carried by the carriage 5 fixed on the draw bench 6. 7 is the blast pipe which we provide formed with two upwardly projecting arms 8, 9, which terminate in side blast pipes 10, 11 which are slightly inclined to the horizontal corresponding with the path which the strip 1 takes in its passage from the furnace to the bell 4. The width of the gap 12 between these blast pipes 10, 11, has to be somewhat greater than the width of the widest strip which is required to pass between them. 13, 14, 15, are rollers arranged between and carried by the blast pipes 10, 11, to assist in supporting the strip 1. Or instead of these rollers, the strip 1 may, as shown in Fig. 4, be supported in position by ledges 16, 17, fixed to and projecting from the inner sides of the blast pipes 10, 11. Each of the blast pipes 10, 11, is made with an elongated slot shaped nozzle marked respectively 18, 19, arranged at the same inclination to the horizontal as is the strip 1 so that the blast passing through these nozzles 18, 19, will impinge directly upon the edges 20, 21, of the strip 1. Instead of the blast pipes 10, 11, being made with an elongated nozzle 18, 19, they may if desired and for the same purpose be each made with a row of round blast nozzles such as 22 Fig. 5. The combined blast pipe 7, 8, 9, 10 and 11 is provided with feet 23, 24, by which it is fixed to the draw bench 6 so as to be movable therewith across the mouth of the furnace as will readily be understood. The blast is supplied to the pipe 7 by a blast pipe 25 from any convenient source an ordinary stop valve 26 being employed for opening and shutting off the blast. As the heated strip 1 is being drawn out of the furnace where it has been heated to a cinder stage and while on its way to the bell 4 its edges 20, 21, are raised to the proper welding heat by the air blast or mixed air and gas blast, which plays upon them through the nozzles 18, 19, and thus when they are pressed together in the bell 4 a perfect butt weld is formed. We find in actual practice that the air blast alone impinging on these heated edges as aforesaid does increase their temperature up to the proper welding heat.

The guide rollers 13, 14, 15 or the ledges 16, 17, are so arranged as to properly support the strip 1 with its edges just level with the blast nozzles 18, 19, so that the blast will play properly upon said edges.

We do not find it necessary for the blast pipes 10, 11, to be made adjustable nearer together or farther apart to suit strips of different widths, as it is not imperative that the blast nozzles should be any particular distance from the edges 20, 21, of the strip 1 so long as the blast properly impinges upon them as aforesaid.

In order to blow away any scale or sand which there may be on the upper or lower surface of the strip 1, a vertical air blast pipe 27 may be provided and arranged to deliver an air blast on to the strip as shown in Fig. 2.

In order to keep the strip 1 down on the guide rollers 13, 14, 15, or ledges 16, 17, so that its edges 20, 21, will be in the proper position for the blast passing through the nozzles 18, 19, to impinge upon them, a removable top plate 28 may be used and arranged to fit down on to the strip 1 between the blast pipes 10, 11, and carried by a lever 29 which turns on a fulcrum 30 which is provided with a lever arm 31 to which a connecting bar 32 is jointed, so that after the heated strip 1 has been drawn from the furnace and its end introduced into the bell 4, the connecting rod 32 can be pulled so as to turn the lever and bring the plate 28 down on to the strip 1 and thus prevent it rising out of position as stated above.

In the arrangement of our invention illustrated by Figs. 6 and 7 as applied to the manufacture of lap welded steel and iron tubes and in which, as is well known, the edges of the skelp are first scarfed down and nearly closed together ready for welding, we find that one blast pipe such as 33 is sufficient and this is made of a convenient length, say for instance two feet more or less, and is situated between the mouth 34 of the furnace and the welding rolls 35 and is fixed in such a position as shown that the blast issuing from its nozzle 36 will be directed right into the space between the two scarfed edges 37, 38, of the skelp 39 as it is passing from the furnace to the welding rolls 35 thus raising the scarfed edges 37, 38, up to the proper welding heat before they enter the welding rolls 35 and a proper and perfect lap weld is thus formed, the other part of the tube meanwhile being less hot and therefore without any risk of its being overheated. The blast pipe 33 can readily be adjustably supported in position by a bracket or stand 40 in the top end of which fits the shank 41 of an eye piece 42 at right angles to the shank and in the latter there is a shank 43 which is fixed to and projects from the horizontal part of the blast pipe 33. The shank 43 is secured in the eye 42 by a set screw 44 and the shank 41 is held in the top part of the bracket 40 by a set screw 45. By this means the blast pipe 33 can be altered in position and set so that the blast passing through the nozzle 36 will impinge properly upon the scarfed edges 37, 38, as will readily be understood. 46 is the usual trough section guide which supports the skelp on its passage from the furnace 34 to the closing and welding rolls 35.

The process or method carried out by the apparatus hereinbefore described is not herein claimed, as the same forms the subject matter of an application filed by us June 11, 1907, Serial No. 378,369, of which this application is a division.

Having now fully described our invention, what we claim and desire to protect by Letters Patent is:—

1. In an apparatus for manufacturing metal tubes, the combination with a furnace and a device to bring together and weld the edges of the tube, of a blast pipe, substantially spanning the space between the furnace mouth and the welding device, adapted to direct a blast of air against the edges of the traveling skelp nearly throughout its entire exposed length, whereby the edges of the skelp between its emergence from the furnace and the welding operation are kept substantially continuously exposed to an air blast for the purpose of preventing cooling of the edges and also of elevating the temperature of the edges and cleaning them from foreign substances, thereby permitting welding without danger of overheating in the furnace and without direct application of heat between the furnace and the welding device.

2. In an apparatus for manufacturing metal tubes, the combination with a furnace and a device to bring together and weld the edges of the tube, of a guiding support between the furnace mouth and the welding device over and along which the skelp is adapted to travel, and a blast pipe arranged along the guiding support having a nozzle located above the support and adapted to direct a blast of air against the edge of the traveling skelp.

3. In an apparatus for manufacturing metal tubes from strips, the combination with a furnace and a bell in which the strip is bent into tubular form, of means, located between the mouth of the furnace and the bell, for directing blasts of air transversely toward each other, and means to guide the strip between said nozzles whereby the opposite edges of the strip are acted upon by said blasts.

4. In an apparatus for manufacturing metal tubes from strips, the combination with a furnace and a bell in which the strip is bent into tubular form, of side blast pipes extending between the mouth of the furnace and the bell, nozzles in the inner side walls of said pipes, and supports, between the furnace mouth and the bell, located immediately below the level of said nozzles and over and along which the strip is adapted to travel in its passage from the furnace mouth to the bell.

5. In an apparatus for manufacturing metal tubes from strips, the combination with a furnace and a bell in which the strip is bent into tubular form, of side blast pipes extending between the mouth of the furnace and the bell, nozzles in the inner side walls of said pipes, supports, between the furnace mouth and the bell, located immediately below the level of said nozzles and over and along which the strip is adapted to travel in its passage from the furnace mouth to the bell, and a top plate extending between the side blast pipes and adapted to overlie the strip.

6. In an apparatus for manufacturing metal tubes from strips, the combination with a furnace and a bell in which the strip is bent into tubular form, of means, located between the mouth of the furnace and the bell, for directing blasts of air transversely toward each other, supports, located immediately below the level of the nozzles, along which said strip is adapted to travel, and a pivoted top plate adapted to be swung into position over said supports and adapted to hold the strip down on the supports during its travel from the furnace to the bell.

7. In an apparatus for manufacturing metal tubes from strips, the combination with a furnace and a bell in which the strip is bent into tubular form; of side blast pipes, underlying supports, and an overlying top plate, all located between the furnace mouth and the bell and forming a channel within which the strip is adapted to travel; there being nozzles in the inner walls of the side blasts adapted to direct blasts of air toward each other.

8. In an apparatus for manufacturing metal tubes from strips, the combination with the furnace and a bell in which the strip is bent into tubular form, of a blast pipe having upwardly extending diverging branches, side blast pipes communicating respectively with said branch pipes and extending between the furnace mouth and the bell, supports between the furnace mouth and the bell over which the strip is adapted to travel, and nozzles in the inner walls of the side blast pipes adapted to direct blasts of air against the opposite edges of the strip.

9. In an apparatus for manufacturing metal tubes from strips, the combination with the furnace and a bell in which the strip is bent into tubular form, of a blast pipe having upwardly extending diverging branches, side blast pipes communicating respectively with said branch pipes and extending between the furnace mouth and the bell, supports between the furnace mouth and the bell over which the strip is adapted to travel, and nozzles in the inner walls of the side blast pipes adapted to direct blasts of air against the opposite edges of the strip, and a top plate extending between the side blast pipes and adapted to overlie the strip.

10. In an apparatus for manufacturing metal tubes from strips, the combination with the furnace, of a draw bench, a carriage fixed thereon, a bell, carried by the carriage, in which the strip is adapted to be bent into tubular form and welded, a blast pipe having upwardly extending diverging branches, side blast pipes communicating respectively with said branch pipes, supports between the furnace mouth and the bell over which the strip is adapted to travel, nozzles in the inner walls of the side blast pipes adapted to direct blasts of air against the opposite edges of the strip, feet on the side blast pipes supported on the draw bench, a vertical blast pipe adapted to deliver a blast of air upon the side of the strip, a top plate extending between the side blast pipes and adapted to overlie the strip, and a pivoted lever carrying said top plate.

In testimony of which invention, I, the said WESLEY J. MOON, have hereunto set my hand at Ambridge, Pennsylvania, on this fourth day of August, 1910, and I, the said JOHN W. MOON, have hereunto set my hand at Conshohocken, on this 18th day of August, 1910.

WESLEY J. MOON.
JOHN W. MOON.

Witnesses as to Wesley J. Moon:
JAMES RATTREY,
WM. A. SOUGER.

Witnesses as to John W. Moon:
GEO. M. S. LIGHT,
E. E. WALL.